Patented July 15, 1952

2,603,635

UNITED STATES PATENT OFFICE 2,603,635

PREPARATION OF ORGANIC ACID ESTERS OF CELLULOSE

George W. Seymour, Maplewood, Blanche B. White, Summit, and Mark Plunguian, Gillette, N. J., assignors to Celanese Corporation of America, New York, N. Y., a corporation of Delaware No Drawing. Application September 15, 1949, Serial No. 115,946

11 Claims. (Cl. 260—229)

This invention relates to the preparation of organic acid esters of cellulose, and relates more particularly to an improved process for the preparation of organic acid esters of cellulose in a continuous manner.

In the preparation of organic acid esters of cellulose by the esterification of a cellulosic material, it is customary to pretreat the cellulosic material before esterification to increase its reactivity and thereby reduce the total esterification time. This pretreatment is generally effected by contacting the cellulosic material for a period of several hours with a lower aliphatic acid in either liquid or vapor form. Following the pretreatment, the cellulosic material is entered into an esterification mixture comprising an organic acid anhydride, a solvent for the ester being formed and an esterification catalyst.

The reaction which takes place when the pretreated cellulosic material is entered into the esterification mixture is strongly exothermic and the heat generated tends to raise the temperature of said mixture. If the rise in temperature is permitted to proceed unchecked, it will cause a degradation of the cellulose molecule, resulting in the production of an organic acid ester of cellulose of extremely low viscosity that is not suited for the preparation of filaments and films. To prevent such a degradation of the cellulose molecule, the esterification mixture is cooled initially to an extremely low temperature and, in addition, external cooling is applied to the reaction mixture with the object of further controlling the temperature thereof. Usually the heat generated during the esterification is permitted to cause a gradual and controlled increase in the temperature of the reaction mixture over a period of several hours to a peak of about 35 to 50° C. At this stage of the esterification, a part of the cellulosic material is still not completely esterified. Accordingly, the reaction mixture is held at this peak temperature for an additional period of several hours until all of the cellulosic material is esterified and has passed into solution.

Since both the pretreatment and the esterification require several hours for their completion, it has hitherto not been practical to carry on these steps in a continuous manner. Instead, it has been necessary to carry on both the pretreatment and esterification on a batch basis, requiring a large number of individual reactors, thus involving a great deal of labor and a large capital outlay.

It is an important object of this invention to provide a process for preparing organic acid esters of cellulose which will be free from the foregoing and other disadvantages of the processes hitherto employed for this purpose and which will be especially simple and efficient in operation.

A further object of this invention is the provision of a process for preparing organic acid esters of cellulose which may be carried out in a continuous manner.

Another object of this invention is the provision of a novel process for pretreating cellulosic material which may be carried out in a relatively short period of time and which will render said cellulosic material highly reactive.

A still further object of this invention is the provision of a novel process for esterifying cellulosic material which may be carried to completion in a relatively short period of time.

Other objects of this invention will be apparent from the following detailed description and claims.

We have now discovered that the time necessary for the pretreatment of the cellulosic material may be reduced from a period of several hours to a period of materially less than one hour by conditioning the cellulosic material so that it has a moisture content of at least about 5% and then subjecting the conditioned cellulosic material to a pretreatment in two stages. In the first stage of the pretreatment, the cellulosic material is treated with a lower aliphatic acid. Then, after an interval of at least about 2 minutes, the cellulosic material is treated for a period not exceeding about 15 minutes with an additional quantity of a lower aliphatic acid containing from about 5 to 15 parts by weight, for each 100 parts by weight of the cellulosic material, of the esterification catalyst which will be employed during the subsequent esterification.

The pretreated cellulosic material is then contacted with an organic acid anhydride which has been cooled to a temperature below about 10° C. The temperature of the mixture so formed is permitted to rise unchecked to a value of between about 15 and 25° C., and is held within said temperature range of between about 15 and 25° C. for a period of from about 1 to 10 minutes. The temperature of the reaction mixture is then permitted to rise further to a value of from about 30 to 65° C., with the application of external heat if necessary, and it is held within said temperature range until the esterification is complete, which normally takes from about 2 to 15 minutes. We have found that the major portion of the cellulosic material is esterified without suffering any appreciable loss in viscosity during the initial stages of the esterification, i. e. while the temperature of the reaction mixture is below about 25° C. When the temperature is raised, the relatively small proportion of unesterified cellulosic material still present in the reaction mixture is esterified rapidly without in any way impairing the properties of the organic acid ester of cellulose being produced.

In accordance with our process, the time required for both the pretreatment and esterification of the cellulosic material may be reduced to as little as 10 minutes, or even less. Accordingly, the pretreatment and esterification may be readily carried out in a continuous manner.

While our invention will be described in connection with the preparation of cellulose acetate, it is to be understood that it is also applicable to the preparation of other organic acid esters of cellulose, such as, for example, cellulose propionate, cellulose acetate proprionate, cellulose butyrate, cellulose acetate butyrate and the like.

The process of the present invention may be applied to any suitable cellulosic material such as, for example, cotton linters or wood pulps or the like from which the lignin, pentosan, resins and similar constituents have been removed, as for example, sulfite pulp, sulfate pulp, or soda pulp. In addition there may be employed cellulosic material derived from other sources such as bamboo, reeds, jute, esparto, bagasse, straws such as linseed and hempseed straw, grasses, peanut hulls, bark, etc. The cellulosic material may be employed in the form of a mass of loose fibers. However, it is particularly advantageous, when the process of our invention is to be carried out in a continuous manner, to employ the cellulosic material in the form of a sheet formed from matted cellulosic fibers, which sheet may be forwarded continuously while the several treating media are applied.

Before the cellulosic material is pretreated, it must be conditioned so that it has a moisture content of at least about 5% by weight. This conditioning may be readily effected by spraying the required quantity of water onto the cellulosic material, or by passing the cellulosic material through a chamber maintained at a high humidity by the injection of steam or water. We have found that if the moisture content of the cellulosic material drops below the value specified above, the pretreatment and esterification will require a considerably longer period of time.

Any of the lower aliphatic acids including acetic, propionic and butyric acids, or mixtures thereof, may be employed during the first pretreating stage in concentrations ranging from about 80 to 100% by weight, the remainder being water, and in quantities ranging from about 15 to 75 parts by weight for each 100 parts by weight of the cellulosic material. If desired, up to about 2 parts by weight of an esterification catalyst may be added to the lower aliphatic acid for each 100 parts by weight of the cellulosic material. The time of pretreatment during the first stage, that is, the time during which the lower aliphatic acid is added to the cellulosic material, is not critical and may range from as little as 2 seconds, or even less, to any desired value. Although shorter pretreating periods during this stage are preferred as being most efficient in the use of equipment and personnel, longer pretreating periods are not objectionable since they do not affect unfavorably the properties of the pretreated cellulosic material. The lower aliphatic acid may be applied to the cellulosic material at room temperature or at a temperature above or below room temperature.

After the first pretreating stage and before the second pretreating stage, an interval of at least about 2 minutes is permitted to elapse, during which time the lower aliphatic acid enters into the fibers of the cellulosic material. This interval may be kept to a minimum by heating the lower aliphatic acid that is applied to the cellulosic material during the first pretreating stage so that the cellulosic material is brought to a temperature ranging from about 40 to 80° C. In a continuous process, the necessary interval of time between the first and second pretreating stages may be obtained by applying the pretreating agents at spaced points and forwarding the cellulosic material from one point to another at a given speed.

The first pretreating stage is followed by the second pretreating stage wherein the cellulosic material is treated for a period not exceeding about 15 minutes with an additional quantity of a lower aliphatic acid containing from about 5 to 15 parts by weight of the esterification catalyst for each 100 parts by weight of the cellulosic material. If a longer pretreating period is employed there is the danger that the high concentration of esterification catalyst will degrade the cellulose molecule and thereby cause an excessive reduction in the viscosity of the final product, rendering the same unsuitable for the preparation of films and filaments. The lower aliphatic acid is employed in concentrations ranging from about 95 to 100% by weight, the remainder being water, and in quantities ranging from about 200 to 600 parts by weight for each 100 parts by weight of the cellulosic material. The lower aliphatic acid containing the esterification catalyst may be applied to the cellulosic material at room temperature or at a temperature above or below room temperature.

Any of the known esterification catalysts may be employed for pretreating the cellulosic material in accordance with the process of this invention, but it is preferred to employ sulfuric acid for this purpose since it produces a cellulosic material having the highest reactivity in the shortest period of time.

The pretreating agents may be applied to the cellulosic material in any desired manner. For example, they may be sprayed or rolled onto the cellulosic material, or, when the cellulosic material is in sheet form, they may be applied as a continuous film from a perforated or slotted conduit extending the width of the sheet.

When the cellulosic material is pretreated in sheet form, it is desirable for the subsequent esterification operations to shred the pretreated sheet so as to weaken or destroy the fiber to fiber bonds therein and cause the sheet to disintegrate before or during the initial stages of the esterification. The shredding may be effected mechanically by means of a rotating wire brush, a serrated rod, or other suitable means which will separate the fibers making up the sheet. Alternatively, the shredding may be effected chemically. For example, the pretreating agent may be applied to the sheet during the second pretreating stage at an elevated temperature so that the cellulosic material is brought to a temperature of between about 40 and 80° C., which will tenderize the sheet making it easy to disintegrate the same with a minimum of shear and surface pressure. The sheet may also be shredded by treatment with the organic acid anhydride that will be employed to effect the esterification, which treatment will cause the sheet to swell to two to three times its original thickness and disintegrate in a matter of seconds. When the organic acid anhydride is employed as a shredding agent, it is necessary to limit the total quantity of pretreating agent applied during the second pretreating stage to between 50 and 100 parts by weight for each 100 parts by weight of the cellulosic material so that the sheet will retain a sufficient absorptive capacity to soak up the organic acid anhydride readily. When the quantity of pretreating agent applied during the second pretreating stage is limited in this manner, a sufficient quantity of lower aliphatic acid may be added to the organic acid anhydride to bring the total quantity of lower aliphatic acid up to between 200 and 400 parts by weight for each 100 parts by weight of the cellulosic material. In addition, the organic acid anhydride may contain up to about 10 parts by weight of the esterification catalyst for each 100 parts by weight of the cellulosic material.

Following the pretreatment, the cellulosic material is esterified by treatment with from about 200 to 250 parts by weight, for each 100 parts by weight of cellulosic material, of an organic acid anhydride which has been cooled to a temperature of below about 10° C. The temperature of the esterification mixture is permitted to rise to a value of between about 15 and 25° C. and is held within said temperature range for a period of from about 1 to 10 minutes. The temperature of the esterification mixture is then permitted to rise further to a value of from about 30 to 65° C., with the application of external heat if necessary, and it is held within said temperature range of from about 30 to 65° C. until the esterification is complete, which normally takes from about 2 to 15 minutes. The temperature of the esterification mixture may be permitted to rise continuously during the esterification, provided that it remains within the range of values set forth above for the time specified.

After the esterification is complete, a sufficient quantity of water is added to the esterification mixture to convert any remaining organic acid anhydride to the corresponding acid, following which the cellulose ester, preferably after the addition of a further quantity of water, is permitted to hydrolyze or ripen to impart the desired solubility characteristics thereto. The cellulose ester is then precipitated from the esterification mixture, washed to free it from acids and other impurities, stabilized if necessary, washed again and finally dried.

The following examples are given to illustrate this invention further.

Example I

Onto 100 parts by weight of cotton linters having a moisture content of 6% by weight, there is sprayed 50 parts by weight of acetic acid. The cotton linters are permitted to stand for a period of 5 minutes, with occasional stirring, and are then sprayed with a solution containing 14 parts by weight of sulfuric acid dissolved in 271 parts by weight of acetic acid. The pretreated cotton linters, which are at room temperature, are contacted with 200 parts by weight of acetic anhydride, which is at a temperature of −30° C., producing a mixture having a temperature of 11° C. The temperature of the mixture is permitted to rise to a value of 20° C. in 1 minute and then a further rise to a temperature of 62° C. in a total time of 3 minutes is permitted to take place. There is obtained a cellulose acetate dope having a good clarity and viscosity.

Example II

A sheet formed from cotton linters and having a density of 22 pounds per cubic foot and a thickness of 0.075 inch is passed through an enclosed chamber maintained at a temperature of 40° C. into which chamber low pressure steam is continuously entered to maintain a high humidity therein. Upon emerging from the chamber, the sheet has a moisture content of 7% by weight. Onto the conditioned sheet, there is flowed a film of acetic acid at a rate of 35 parts by weight for each 100 parts by weight of cellulosic material. The acetic acid is heated to a temperature of 80° C. bringing the sheet of cellulosic material to a temperature of 50° C. After an interval of 2 minutes, there is flowed onto the sheet of cellulosic material a solution of sulfuric acid in acetic acid at a rate of 14 parts by weight of sulfuric acid and 280 parts by weight of acetic acid per 100 parts by weight of cellulosic material. The solution of sulfuric acid in acetic acid is maintained at a temperature of 80° C. at which temperature the sheet disintegrates readily into a mass of loose fibers with a minimum of shear and surface pressure. The sheet of cellulosic material is entered continuously into a vessel equipped with a stirrer and with a jacket through which a heat transfer medium is circulated at a temperature of −5.5° C. There is also entered into the vessel acetic anhydride at a temperature of 0° C. and at a rate of 200 parts by weight for each 100 parts by weight of cellulosic material. The reaction mixture is maintained in the vessel for a period of 3 minutes, during which time its temperature rises to 15° C. The reaction mixture is then entered continuously into another vessel equipped with a stirrer and with a jacket through which a heat transfer medium is circulated at a temperature of 44° C. The reaction mixture is maintained in the second vessel for a period of 5 minutes during which time its temperature rises to 39° C. There is obtained a cellulose acetate dope having a good clarity and viscosity.

It is to be understood that the foregoing detailed description is given merely by way of illustration and that many variations may be made therein without departing from the spirit of our invention.

Having described our invention, what we desire to secure by Letters Patent is:

1. In a process for the preparation of organic acid esters of cellulose from cellulosic material, the steps which comprise subjecting a cellulosic material containing at least 5% by weight of moisture to a multi-stage pretreatment prior to esterification, one stage of said pretreatment comprising the addition to the cellulosic material of a lower aliphatic acid, and another stage of said pretreatment, which is effected after an interval of at least 2 minutes, comprising the addition to the cellulosic material of a further quantity of a lower aliphatic acid containing an esterification catalyst in an amount of 5 to 15 parts by weight for each 100 parts by weight of the cellulosic material, the treatment not exceeding a period of about 15 minutes.

2. In a process for the preparation of organic acid esters of cellulose from cellulosic material, the steps which comprise subjecting a cellulosic material in sheet form and containing at least 5% by weight of moisture to a multi-stage pretreatment prior to esterification, one stage of said pretreatment comprising the addition to the cellulosic material of a lower aliphatic acid, and another stage of said pretreatment, which is effected after an interval of at least 2 minutes, comprising the addition to the cellulosic material, without displacing any of the lower aliphatic acid present therein, of a further quantity of a lower aliphatic acid containing an esterification catalyst in an amount of 5 to 15 parts by weight for each 100 parts by weight of the cellulosic material, the treatment not exceeding a period of about 15 minutes, said catalyst-containing lower aliphatic acid being maintained at an elevated temperature to bring the sheet of cellulosic material to a temperature of 40 to 80° C. whereby the sheet is tenderized and may be disintegrated with a minimum of shear and surface pressure.

3. In a process for the preparation of organic acid esters of cellulose from cellulosic material, the steps which comprise subjecting a cellulosic material containing at least 5% by weight of moisture to a multi-stage pretreatment prior to esterification, one stage of said pretreatment comprising the addition to the cellulosic material of a lower aliphatic acid maintained at an elevated temperature to bring the cellulosic material to a temperature of between about 40 and 80° C., and another stage of said pretreatment, which is effected after an interval of at least 2 minutes, comprising the addition to the cellulosic material of a further quantity of a lower aliphatic acid containing an esterification catalyst in an amount of 5 to 15 parts by weight for each 100 parts by weight of the cellulosic material, the treatment not exceeding a period of about 15 minutes.

4. In a process for the preparation of organic acid esters of cellulose from cellulosic material, the steps which comprise subjecting a cellulosic material in sheet form and containing at least 5% by weight of moisture to a multi-stage pretreatment prior to esterification, one stage of said pretreatment comprising the addition to the cellulosic material of a lower aliphatic acid maintained at an elevated temperature to bring the cellulosic material to a temperature of between about 40 and 80° C., and another stage of said pretreatment, which is effected after an interval of at least 2 minutes, comprising the addition to the cellulosic material, without displacing any of the lower aliphatic acid present therein, of a further quantity of a lower aliphatic acid containing an esterification catalyst in an amount of 5 to 15 parts by weight for each 100 parts by weight of the cellulosic material, the treatment not exceeding a period of about 15 minutes, said catalyst-containing lower aliphatic acid being maintained at an elevated temperature to bring the sheet of cellulosic material to a temperature of 40 to 80° C. whereby the sheet is tenderized and may be disintegrated with a minimum of shear and surface pressure.

5. In a process for the preparation of organic acid esters of cellulose from cellulosic material, the steps which comprise subjecting a cellulosic material in sheet form and containing at least 5% by weight of moisture to a multi-stage pretreatment prior to esterification, one stage of said pretreatment comprising the addition to the cellulosic material of a lower aliphatic acid, and another stage of said pretreatment, which is effected after an interval of at least 2 minutes, comprising the addition to the cellulosic material of from about 50 to 100 parts by weight of a lower aliphatic acid containing an esterification catalyst in an amount of 5 to 15 parts by weight for each 100 parts by weight of the cellulosic material, the treatment not exceeding a period of about 15 minutes, and treating the cellulosic material in sheet form with an organic acid anhydride whereby the sheet disintegrates.

6. In a process for the preparation of organic acid esters of cellulose from cellulosic material, the steps which comprise subjecting a cellulosic material containing at least 5% by weight of moisture to a multi-stage pretreatment prior to esterification, one stage of said pretreatment comprising the addition to the cellulosic material of a lower aliphatic acid, and another stage of said pretreatment, which is effected after an interval of at least 2 minutes, comprising the addition to the cellulosic material of a further quantity of a lower aliphatic acid containing an esterification catalyst in an amount of 5 to 15 parts by weight for each 100 parts by weight of the cellulosic material, the treatment not exceeding a period of about 15 minutes, and treating the cellulosic material with an organic acid anhydride, holding the mixture so formed at a temperature of from about 15 to 25° C. for a period of from about 1 to 10 minutes, and then holding said mixture at a temperature of from about 30 to 65° C. until the esterification is complete.

7. In a process for the preparation of organic acid esters of cellulose from cellulosic material, the steps which comprise subjecting a cellulosic material containing at least 5% by weight of moisture to a multi-stage pretreatment prior to esterification, one stage of said pretreatment comprising the addition to the cellulosic material of a lower aliphatic acid and another stage of said pretreatment, which is effected after an interval of at least 2 minutes, comprising the addition to the cellulosic material of a further quantity of a lower aliphatic acid containing an esterification catalyst in an amount of 5 to 15 parts by weight for each 100 parts by weight of the cellulosic material, the treatment not exceeding a period of about 15 minutes, and treating the cellulosic material with an organic acid anhydride which has been cooled to a temperature of below about 10° C., holding the mixture so formed at a temperature of from about 15 to 25° C. for a period of from about 1 to 10 minutes, and then holding said mixture at a temperature of from about 30 to 65° C. until the esterification is complete.

8. In a process for the preparation of cellulose acetate from cellulosic material, the steps which comprise subjecting a cellulosic material containing at least 5% by weight of moisture to a multi-stage pretreatment prior to esterification, one stage of said pretreatment comprising the addition to the cellulosic material of acetic acid, and another stage of said pretreatment, which is effected after an interval of at least 2 minutes, comprising the addition to the cellulosic material of a further quantity of acetic acid containing an esterification catalyst in an amount of 5 to 15 parts by weight for each 100 parts by weight of the cellulosic material, the treatment not exceeding a period of about 15 minutes, and treating the cellulosic material with acetic acid anhydride which has been cooled to a temperature of below about 10° C., holding the mixture so formed at a temperature of from about 15 to 25° C. for a period of from about 1 to 10 minutes, and then holding said mixture at a temperature of from about 30 to 65° C. for a period of from about 2 to 15 minutes.

9. In a process for the preparation of cellulose acetate from cellulosic material, the steps which comprise subjecting a cellulosic material containing at least 5% by weight of moisture to a multi-stage pretreatment prior to esterification, one stage of said pretreatment comprising the addition to the cellulosic material of acetic acid, and another stage of said pretreatment, which is effected after an interval of at least 2 minutes, comprising the addition to the cellulosic material of a further quantity of acetic acid containing an esterification catalyst in an amount of 5 to 15 parts by weight for each 100 parts by weight of the cellulosic material, the treatment not exceeding a period of about 15 minutes, and treating the cellulosic material with acetic anhydride which has been cooled to a temperature of below about 10° C., holding the mixture so formed at a temperature of from about 15 to 25° C. for a period of from about 1 to 10 minutes, and then holding said mixture at a temperature of from about 30 to 65° C. for a period of from about 2 to 15 minutes.

10. In a process for the preparation of cellulose acetate from cellulosic material, the steps which comprise subjecting a cellulosic material containing at least 5% by weight of moisture to a multi-stage pretreatment prior to esterification, one stage of said pretreatment comprising the addition to the cellulosic material of from about 15 to 75 parts by weight of acetic acid for each 100 parts by weight of cellulosic material, and another stage of said pretreatment, which is effected after an interval of at least 2 minutes, comprising the addition to the cellulosic material of from about 200 to 600 parts by weight of acetic acid containing an esterification catalyst in an amount of 5 to 15 parts by weight for each 100 parts by weight of the cellulosic material, the treatment not exceeding a period of about 15 minutes, and treating the cellulosic material with acetic anhydride which has been cooled to a temperature of below about 10° C., holding the mixture so formed at a temperature of from about 15 to 25° C. for a period of from about 1 to 10 minutes, and then holding said mixture at a temperature of from about 30 to 65° C. for a period of from about 2 to 15 minutes.

11. In a process for the preparation of cellulose acetate from cellulosic material, the steps which comprise subjecting a cellulosic material containing at least 5% by weight of moisture to a multi-stage pretreatment prior to esterification, one stage of said pretreatment comprising the addition to the cellulosic material of from about 15 to 75 parts by weight of acetic acid for each 100 parts by weight of cellulosic material, and another stage of said pretreatment, which is effected after an interval of at least 2 minutes, comprising the addition to the cellulosic material of from about 200 to 600 parts by weight of acetic acid containing a sulfuric acid catalyst in an amount of 5 to 15 parts by weight for each 100 parts by weight of the cellulosic material, the treatment not exceeding a period of about 15 minutes, and treating the cellulosic material with acetic anhydride which has been cooled to a temperature of below about 10° C., holding the mixture so formed at a temperature of from about 15 to 25° C. for a period of from about 1 to 10 minutes, and then holding said mixture at a temperature of from about 30 to 65° C. for a period of from about 2 to 15 minutes.

GEORGE W. SEYMOUR.
BLANCHE B. WHITE.
MARK PLUNGUIAN.

REFERENCES CITED

The following references are of record in the file of this patent:

UNITED STATES PATENTS

| Number | Name | Date |
| --- | --- | --- |
| 1,389,250 | Koetschet et al. | Aug. 30, 1921 |
| 1,543,310 | Altwegg | June 22, 1925 |
| 1,916,273 | Martin | July 4, 1933 |
| 2,105,498 | Parrett | Jan. 18, 1938 |
| 2,113,301 | Gardner | Apr. 5, 1938 |
| 2,140,639 | Malm et al. | Dec. 20, 1938 |
| 2,164,416 | Marschall | July 4, 1939 |
| 2,391,569 | Haney et al. | Dec. 25, 1945 |
| 2,487,892 | Richter et al. | Nov. 15, 1949 |